Figure 1:
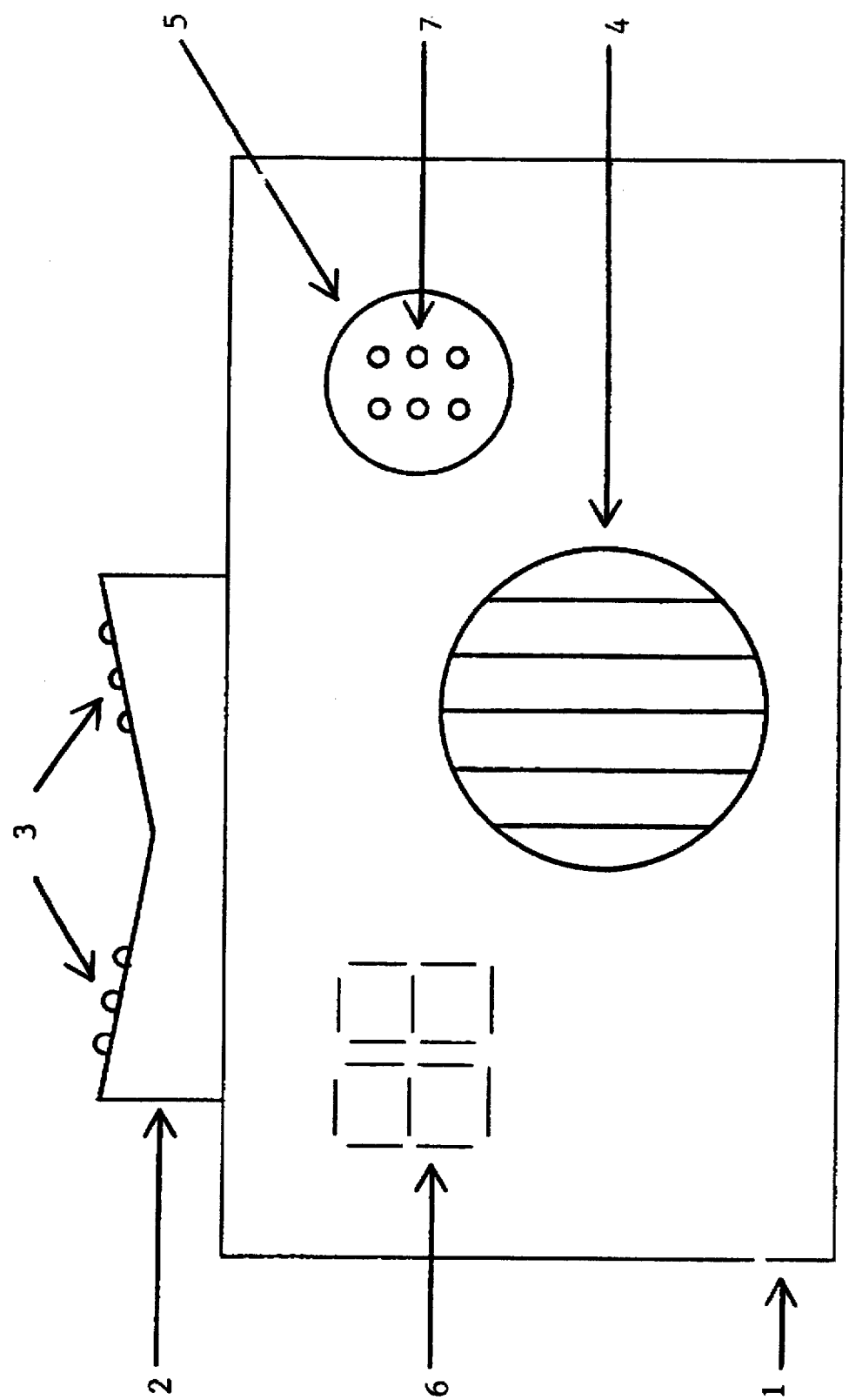

United States Patent [19]
Flood

[11] Patent Number: 5,690,277
[45] Date of Patent: Nov. 25, 1997

[54] AUDIBLE THERMOSTAT

[76] Inventor: Scott W. Flood, 74 Buckingham La., Hopkinton, N.H. 03229

[21] Appl. No.: 386,513

[22] Filed: Feb. 6, 1995

[51] Int. Cl.⁶ .................. G05D 23/00; G01D 13/22
[52] U.S. Cl. .................. 236/94; 116/205; 165/11.1
[58] Field of Search .................. 236/94; 165/11.1; 116/205

[56] References Cited

U.S. PATENT DOCUMENTS

| | | | |
|---|---|---|---|
| 2,464,146 | 3/1949 | Mohler | 116/205 X |
| 4,265,395 | 5/1981 | Sumikawa et al. | 236/94 X |
| 4,428,685 | 1/1984 | Lemelson | 374/163 |
| 4,460,125 | 7/1984 | Barker et al. | 236/94 |
| 4,582,251 | 4/1986 | Odom, Jr. et al. | 236/94 |
| 5,011,032 | 4/1991 | Rollman | 116/321 X |

FOREIGN PATENT DOCUMENTS

| | | | |
|---|---|---|---|
| 0034051 | 4/1981 | Japan | 165/11.1 |
| 0179759 | 10/1983 | Japan | 165/11.1 |

*Primary Examiner*—William E. Wayner
*Attorney, Agent, or Firm*—Robert W. Nelson

[57] ABSTRACT

This invention is an audible thermostat designed for use by the visually impaired and totally blind. The thermostat has a speaker to indicate the setting of the thermostat or the ambient room temperature. It may also have a visual display working in conjunction with the audible output. The mechanisms to operate the thermostat are large and contain tactile surfaces so the blind may locate the correct mechanism.

4 Claims, 1 Drawing Sheet

AUDIBLE THERMOSTAT

This invention relates to a thermostat for use by the visually impaired. More particularly it is a thermostat with an audible output inform the user of the ambient temperature of the area of the thermostat as well as the setting of the thermostat. The thermostat may also have an illuminated display to visually indicate the ambient temperature and the setting of the thermostat.

BACKGROUND

As the population grows older, more people are having difficulty seeing detailed items. One such area of difficulty is reading the setting of a thermostat. The totally blind presently have no way of knowing the setting of a thermostat and the visually impaired must have visual enhancers such as magnifying or corrective lenses in order to view a thermostat. Thermostats are hard to read due to their inconspicuous size on a wall. Furthermore, most thermostat settings are made when going to or awakening from bed, when most people do not have their visual enhancers on.

Therefore, there is a need for a thermostat that will indicate to the blind and visually impaired the ambient temperature of the area of the thermostat and the setting of the thermostat.

SUMMARY

This invention is a thermostat with an audible output that may be coupled with a large illuminated display. The thermostat emits audible tones, such as voice, indicating the ambient temperature of the area of the thermostat and the setting of the thermostat. The thermostat may also contain a large illuminated display so that the visually impaired, but not yet blind, can read the indication without the use of visual enhancers.

An objective of this invention is to provide a thermostat that emits audible tones indicating the ambient temperature of the area of the thermostat.

Another objective of this invention is to provide a thermostat that emits audible tones indicating the setting of the thermostat.

Another objective of this invention is to provide a thermostat with large activation switches, so the visually impaired and/or blind may easily find and manipulate the controls for the thermostat.

Another objective of this invention is to provide a thermostat with illuminated displays, so the visually impaired may read the settings and ambient temperature without the use of visual enhancers.

Another objective of this invention is to provide a thermostat with tactile surfaces, such as Braille, indicating the function of the control surface.

DESCRIPTION

FIG. 1 depicts an embodiment of the invention. Thermostat 1 mounts on a wall or other convenient location. The thermostat setting is activated by rocker switch 2. Depressing on one side of rocker switch 2 will cause the thermostat setting to increase, depressing on the other side of rocker switch 2 will cause the thermostat setting to decrease. Rocker switch 2 has tactile surfaces, such as Braille indicators 3, to assist the visually impaired in identifying the function of rocker switch 2. In one embodiment, Braille indicators 3 are the words 'Up' and 'Down' indicating the side of rocker switch 2 to depress to increase and decrease the thermostat setting.

Activation of the thermostat setting will trigger speaker 4 to audibly indicate the increased or decreased setting of the thermostat. An embodiment of thermostat includes an audible tone wherein the audible tone emitted by speaker 4 is a variations in pitch to indicate thermostat setting. Another embodiment of the thermostat includes an audible tone emitted by speaker 4 wherein the audible tone is a voice.

An embodiment of the invention includes button 5 which indicates the ambient temperature of the area of the thermostat. When button 5 is depressed, speaker 4 indicates the ambient temperature of the area of the thermostat. Another function of button 5 may be to trigger speaker 4 to indicate the setting of the thermostat. An embodiment of the thermostat has Braille indicators 7 on button 5 to further assist the visually impaired in using button 5. Another embodiment of button 5 consists of making button 5 a plunger type button.

Another embodiment of the thermostat includes a large illuminated display 6. This is a lighted display, such as light emitting diodes, for indicating the setting and temperature of the thermostat. The indication on display 6 is the same as to what is being audibly indicated by speaker 4.

Thermostat 1 is laid out such that a visually impaired person may change the temperature of a room or be informed of the ambient temperature of a room by utilizing rocker switch 2 or button 5. The user feels Braille indicators 3 to indicate where to press rocker switch 2 in order to increase or decrease the temperature setting of the thermostat. The user may also feel Braille indicator 7 on button 5 to identify button 5. As the temperature setting is changing, speaker 4 audibly indicates the setting and display 6 visually displays the setting. If the user wants to know the temperature of the room, he depresses button 5, which has Braille indicator 7 to assist the user. The ambient room temperature is audibly indicated by speaker 4 and visually indicated by display 6.

The sound or voice may be generated in several methods presently known in the art. One such method is by converting the temperature data to digital data and inputting the digital representation of temperature to a voice synthesizer. Likewise any other sounds or instructions can be stored as digital data and input into the same voice synthesizer. An example of such a voice sythesization system is detailed in U.S. Pat. No. 5,181,521 issued to Lemelson.

When the temperature information is in a digital number format, it may be easily manipulated and displayed, visually or audibly. As such, an embodiment of Rocker Switch 2 controls a counter, which adds or subtracts to the preset temperature of the thermostat.

What is claimed is:

1. An audible thermostat comprising an audible output in conjunction with said thermostat whereby said audible output is a synthesized human voice indicating the setting of the thermostat or the ambient temperature in the proximity of the audible thermostat and an adjustment mechanism which allows a user to adjust the thermostat setting and obtain an audible indication as to the setting as the thermostat setting is being adjusted.

2. An audible thermostat as recited in claim 1 wherein the adjustment mechanism is a rocker switch situated such that depressing on one end of said rocker switch will increase the temperature setting and depressing on the other end of the rocker switch will decrease the temperature setting.

3. An audible thermostat comprising an audible output in conjunction with said thermostat whereby said audible output is a tone indicating the setting of the thermostat or the ambient temperature in the proximity of the audible thermostat and an adjustment mechanism which allows a user to adjust the thermostat setting and obtain a tone indication as to the setting as the thermostat setting is being adjusted, said tone being a higher frequency for higher temperature indications and a lower frequency for lower temperature indications.

4. An Audible thermostat as recited in claim 3 wherein the adjustment mechanism is a rocker switch situated such that depressing on one end of said rocker switch will increase the temperature setting and depressing on the other end of the rocker switch will decrease the temperature setting.

* * * * *